United States Patent [19]

Rupp

[11] 3,816,997

[45] June 18, 1974

[54] APPARATUS FOR SIMULTANEOUSLY PERFORMING ROUGH AND FINE GRINDING OPERATIONS

[75] Inventor: Wiktor Rupp, Lowell, Mass.

[73] Assignee: Itek Corporation, Lexington, Mass.

[22] Filed: Mar. 20, 1972

[21] Appl. No.: 235,894

[52] U.S. Cl............................................. 51/124 L
[51] Int. Cl............................................. B24b 9/14
[58] Field of Search......... 51/72, 94, 96, 209, 124 L

[56] References Cited
UNITED STATES PATENTS

| | | | |
|---|---|---|---|
| 2,496,352 | 2/1950 | Metzger et al. | 51/209 R |
| 2,510,113 | 6/1950 | Holman et al. | 51/73 R |
| 2,600,815 | 6/1952 | Turner | 51/131 |
| 2,747,340 | 5/1956 | Angenieux | 51/124 L |

Primary Examiner—Al Lawrence Smith
Assistant Examiner—Nicholas P. Godici
Attorney, Agent, or Firm—Homer O. Blair; Robert L. Nathans; Gerald H. Glanzman

[57] ABSTRACT

Apparatus for simultaneously performing rough and fine grinding operations on the surface of a work piece. The apparatus includes a cup-shaped grinding tool having rough and fine grinding rings coaxially mounted for rotation about their common axis. The work piece to be surfaced is supported for movement along a curved path such that the work piece will intersect the grinding tool as it moves along the path. As the work piece moves across the grinding tool, it first encounters the rough grinding ring which rougly grinds the work piece surface and immediately thereafter encounters the fine grinding ring which performs the fine grinding operation on the roughly ground surface. The apparatus is particularly designed to grind glass or plastic lenses into a form ready for polishing although it may also be utilized in a wide variety of other surfacing operations. The apparatus may be designed to grind one lens at a time or a plurality of lenses simultaneously.

9 Claims, 4 Drawing Figures

APPARATUS FOR SIMULTANEOUSLY PERFORMING ROUGH AND FINE GRINDING OPERATIONS

BACKGROUND OF THE INVENTION

1. Field of the Invention

The present invention relates to apparatus for generating optical or other surfaces. More specifically, the present invention relates to apparatus capable of performing a plurality of separate surfacing steps on a work piece in a single operation.

2. Description of the Prior Art

In order to produce a high quality surface on a lens or other element, it is usually necessary to perform a series of separate and distinct surfacing operations. In the case of lens surfacing in particular, at least three operations are generally performed including rough grinding for reducing an oversized and unfinished lens blank to the approximate surface configuration desired; fine grinding for removing any imperfections formed on the lens surface by the rough grinding step; and finally, polishing for bringing the surface to a fine optical finish.

Conventionally, these three operations are performed independently on three separate machines and this presents several significant disadvantages. For one thing, machines of this type are somewhat expensive and since at least three of them would be needed to permit continuous production, they contribute a significant amount to the total cost of the lens manufacturing operation as well as occupy valuable floor space. Secondly, the lens blanks must be transferred from one machine to another and then accurately mounted onto each machine in the proper alignment. This is obviously an undesirable use of operator time and since any misalignment can result in an improperly shaped or otherwise damaged lens, the risk of error is increased each time the lens blanks must be remounted.

In order to improve upon this manufacturing process, attempts have been made in the past to combine the rough and fine grinding steps into a single operation capable of being performed on a single machine. One such attempt is described in U.S. Pat. No. 2,600,815 to Turner wherein a single grinding tool is provided with both rough and fine grinding portions which sequentially operate upon a plurality of lens blanks. The technique described in this patent, however, is still not fully satisfactory. Initially, the geometry of the system is quite complex. Correct operation necessitates several different types of relative motion each of which must be carefully monitored and controlled. Secondly, the system is very dependent upon the wear pattern of both the rough and fine grinding portions of the grinding tool as well as upon the changing surface characteristics of the lens blanks during the surfacing operation, and any uneven wear can result in improper contact between the lenses and the tool and produce poor quality surfaces.

In general, there is no machine presently available in the prior art that will enable lenses to be both rough and fine ground in one operation and with one machine and that will produce lenses ready for polishing at a minimum cost and difficulty.

SUMMARY OF A PREFERRED EMBODIMENT OF THE INVENTION

In accordance with an embodiment of the invention, many of the deficiencies of the prior art have been obviated by providing a novel apparatus capable of performing two separate grinding operations on the surface of a lens or other element in an efficient and economical manner. In accordance with a preferred form of the invention, a grinding tool is provided which is in the form of a cup-shaped wheel having first and second grinding rings of rough and fine abrasive material, respectively, mounted thereto. The rings are mounted coaxially with the fine grinding ring being positioned within the rough grinding ring and are adapted to be rotated about their common axis. Appropriate structure is also provided to carry a lens blank to be treated by the grinding wheel.

In operation, the lens blank is carried along a circular path about an axis which is perpendicular to the common axis of the grinding rings such that the blank will intersect the grinding rings during its movement. In particular, when the lens blank comes into contact with the grinding wheel, it will first encounter the rough grinding ring which will grind the lens blank to approximately the correct surface configuration desired. Immediately thereafter, the portion of the lens blank that has been roughly ground encounters the fine grinding ring which then performs the fine grinding operation thereupon. In this way the entire lens blank surface may be ground in one operation and, generally, in one sweep across the grinding wheel.

By mounting the grinding rings so that their axis of rotation extends through the center of curvature of the circular path of movement of the lens blank, a spherical surface can be formed on the lens blank. By tilting the grinding wheel with respect to the circular path, a semi-toroidal surface may similarly be generated.

In accordance with a second embodiment of the invention, a plurality of lenses may be simultaneously ground in a similar manner utilizing substantially the same equipment.

Several significant advantages are provided by this system. Initially, correct operation of the system is not as dependent upon the wear pattern of the grinding rings or upon the changing shape of the lens blanks during the grinding operation as the prior art. Once the lens blank is properly aligned with respect to the grinding tool, and once the grinding rings have been correctly positioned with respect to each other, accurate rough and fine grinding may be effected with a minimum of further control. In the prior art, the tool must be moved precisely relative to the lens blank surface as the lens surface changes and this makes the geometry of the system quite complex and susceptible to error. Also, the initial shape of the lens blank is not critical as in the prior art. The system of the present invention may be used to grind rectangular blocks of glass or plastic as well as partially shaped lens blanks without modification. Furthermore, the system according to the present invention is quite flexible and may be readily adapted to grind single lenses or a plurality of lenses of various sizes and curvatures.

In general, the present invention provides a highly effective technique for simplifying the lens manufacturing process by combining two of the three steps conventionally used to surface a lens into a single step. This permits substantial savings in equipment, space, and time and hence reduces the manufacturing cost. The system is highly efficient and flexible and quite inexpensive to construct. Yet other features of the invention will be described hereinafter along with a detailed description of the preferred embodiment.

DETAILED DESCRIPTION OF THE PREFERRED EMBODIMENT

Figure 1:
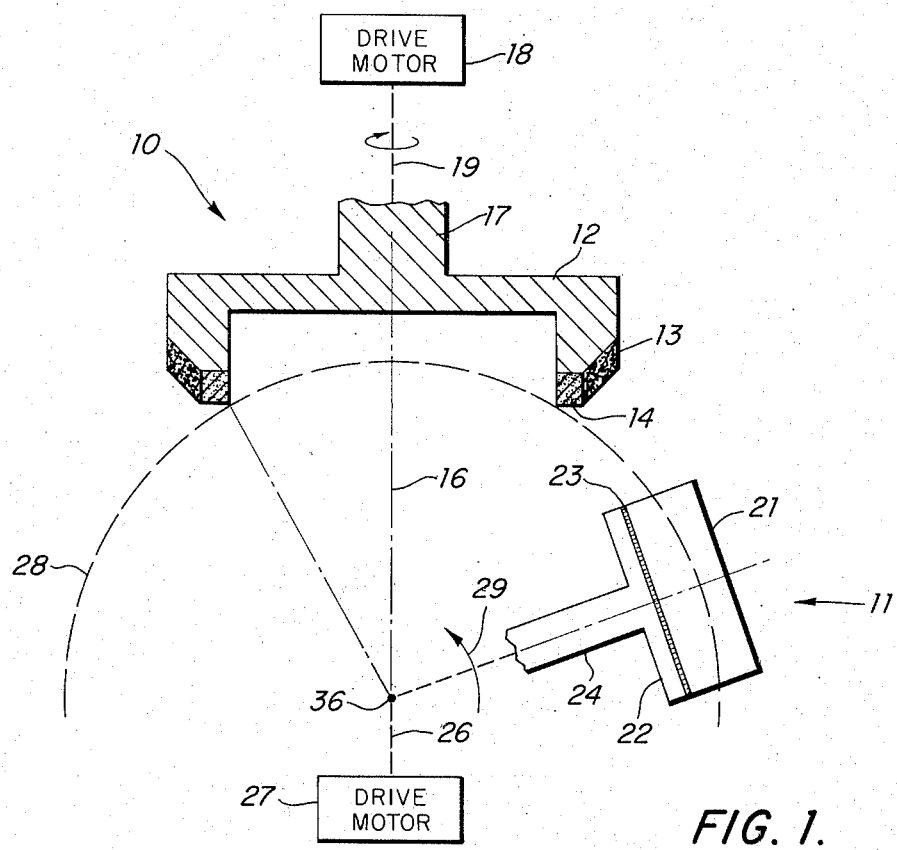
FIG. 1 illustrates an apparatus according to a preferred embodiment of the present invention for generating a curved surface on a lens.

FIG. 1 illustrates, in somewhat schematic form, a presently preferred embodiment of the present invention. As shown, the apparatus includes a grinding tool 10 which is positioned to generate a curved surface on a lens blank generally represented by reference number 11. In particular, the grinding tool is provided for the purpose of simultaneously performing both the rough and fine grinding operations on lens blank 11 and consists of a substantially cup-shaped support member 12 having a pair of annular grinding rings 13 and 14 mounted thereto in coaxial alignment around axis 16. Grinding ring 13 is formed of a relatively rough abrasive material to perform the rough grinding operation on the lens blank while inner grinding ring 14 is formed of a relatively fine abrasive material for performing the fine grinding operation thereon when the lens blank is moved relative to the grinding tool as will be explained in detail hereinafter. Cup-shaped member 12 is additionally provided with a suitable spindle 17 which is coupled to a drive motor 18 through any appropriate mechanical connection 19 such that the tool may be rapidly rotated about axis 16.

Still referring to FIG. 1, lens blank 11 having a surface 21 to be ground is mounted to a support 22 by means of a suitable cement 23 although it should be recognized that other well-known lens mounting techniques such as vacuum chucks or low melting point alloys may also be used if desired in lieu of cement. Support 22 is coupled through spindle 24 and mechanical connection 26 to a drive motor 27 that is adapted to carry lens blank 11 along a curved path 28 in the direction indicated by arrow 29. In particular, path 28 is oriented such that lens blank 11 will sequentially intersect the rough and fine grinding rings 13 and 14, respectively, of the grinding tool for enabling the rings to grind surface 21 of the lens blank to the desired shape. This is illustrated more clearly in FIG. 2 which is a somewhat enlarged view of a portion of FIG. 1 showing the lens blank in the process of being ground.

Figure 2:
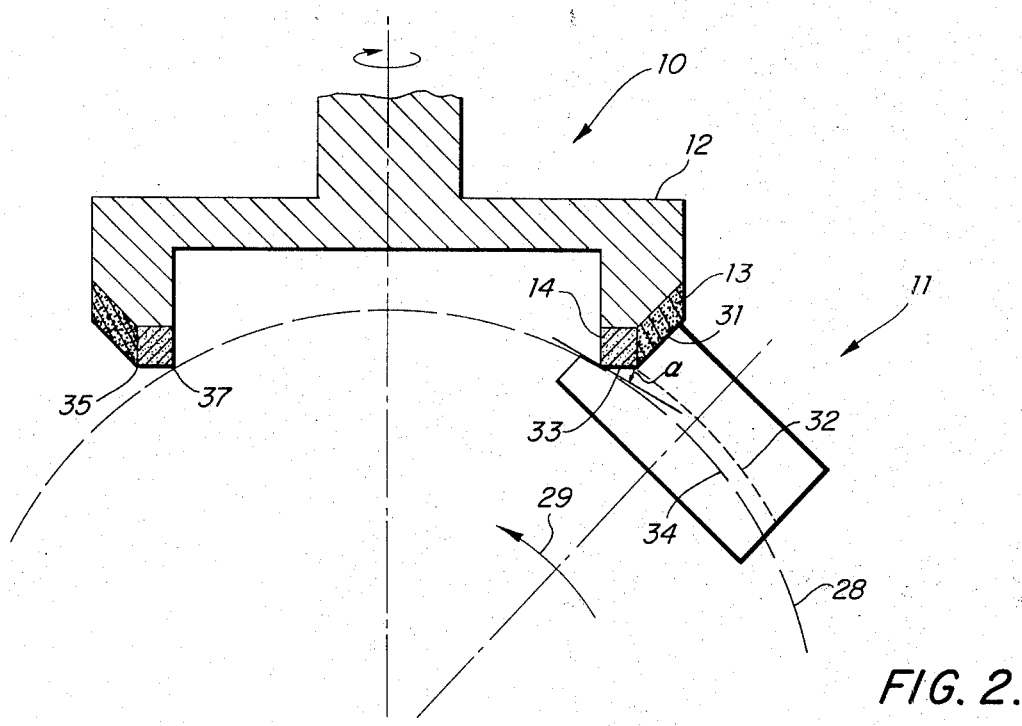
FIG. 2 illustrates a portion of the apparatus of FIG. 1 enlarged for the purpose of explaining certain important features.

As shown in FIG. 2, as the lens blank is carried along path 28 in the direction of arrow 29, it will first come into contact with surface 31 of rough grinding ring 13, and, since the grinding tool is rapidly spinning about its axis, it will grind the lens blank surface to the configuration represented by dotted line 32. Immediately after a portion of the blank has been roughly ground to the configuration illustrated by line 32, that portion will come into contact with surface 33 of fine grinding ring 14 which then finely grinds the lens surface down to the final desired configuration illustrated schematically by dotted line 34. When the lens blank has completely passed the right-hand side of the grinding tool, its entire surface will be reduced to the desired curvature, and generally, is then ready to be polished without further treatment.

Referring back to FIG. 1, curved path 28 is preferably circular in shape to simplify the geometry of the system and the center of curvature of the path is located at point 36. Drive motor 27 moves support 22 and the lens blank carried thereon about an axis that extends through point 36 perpendicular to the plane of the FIGURE and also perpendicular to axis 16 of grinding tool 12. When the grinding tool is aligned such that its axis 16 extends through point 36, a spherical surface will be generated on lens blank 11. Alternatively, by tilting the axis of the tool so that it does not extend through the center of curvature 36, a semi-toroidal surface may similarly be generated.

With reference again to FIG. 2, the manner in which the final shape of the lens blank 11 may be controlled is illustrated. Basically, as the lens blank moves along path 28 toward the grinding tool, it first encounters rough grinding surface 31 which grinds the blank down to a depth illustrated by dotted line 32. The grinding depth is controlled by the orientation between the lowermost point 35 on the rough grinding surface and the lens blank. The precise location of this point as well as the width of surface 31 is not particularly critical, however, as moderate inaccuracies will be corrected during the fine grinding step. This means that a significant amount of wear of the rough grinding ring can be tolerated without endangering the accuracy of the final lens surface.

The portion of the lens blank which has been roughly ground then immediately encounters fine grinding surface 33 which further grinds the lens blank to the surface illustrated by dotted line 34. As shown in FIG. 2, this surface configuration is a function of the acute angle $\alpha$ (the angle between surface 33 and a plane tangent to curve 28 extending through lowermost point 37 of surface 33). By maintaining this angle fixed, the curvature of surface 34 may be precisely controlled and accurately reproduced on a large number of lenses. The amount of lens material removed by the fine grinding operation (i.e. the thickness between surfaces 32 and 34) can also be controlled merely by varying the width of surface 33. In practice it is desirable to provide a substantially large grinding surface area to increase the life of the grinding tool. At the same time, however, the amount of lens material that must be removed to eliminate defects caused by the rough grinding step can vary depending upon the lens material, the grinding abrasive used, and the like. The present invention enables this grinding depth to be readily controlled by simply changing the width of the grinding surface in a manner to maximize the characteristics desired.

In an operative embodiment of the apparatus illustrated in FIGS. 1 and 2, high quality lenses and extended tool life may be obtained by employing, as the rough and fine grinding mediums, abrasives formed of bonded diamond particles although it should be understood that other abrasive materials may also be used. The rough abrasive should generally consist of between about 120–180 mesh diamond particles while the fine abrasive should consist of 400–600 mesh particles depending upon the type of glass or plastic being ground and upon the polishing requirements. Particularly good results have been obtained by moving the lens blank along path 28 at a rate of from about 1–6 inches per minute. This rate would vary, however, depending upon the lens blank material, diamond grit size, tool diameter, etc. The tool should preferably be rotated at about 5,000–10,000 revolutions per minute. The lens blank itself generally does not have to be rotated although such capability could be provided and might be desirable in certain circumstances. Also, it should be noted that the grinding operation is basically completed and the lens ready for polishing when the lens blank has completely passed the right side of the grinding tool (as seen in FIG. 1). It need not be carried across the left side of the tool although this also could be done if desired.

Figure 3:
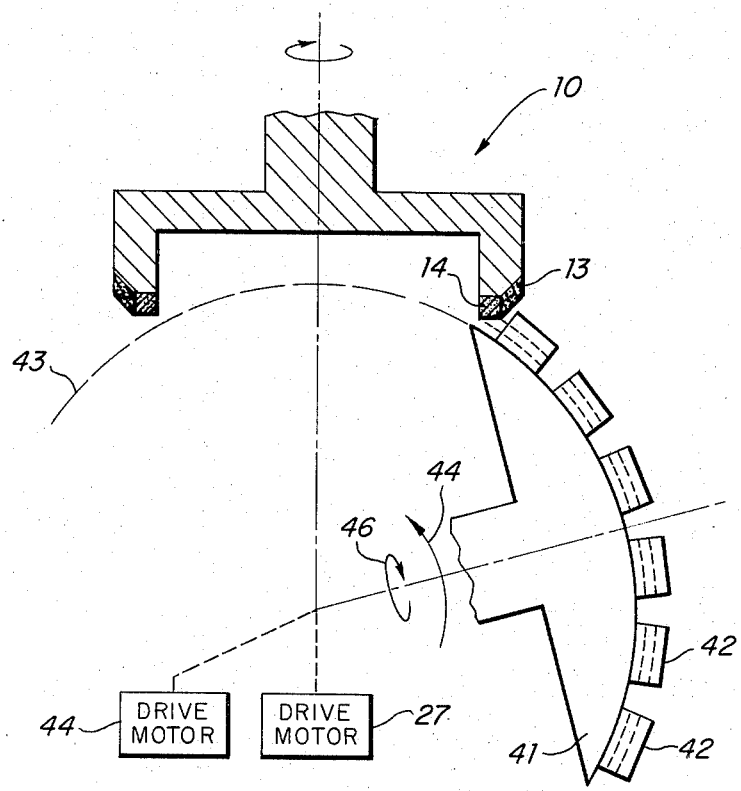
FIGS. 3 and 4 illustrate a second embodiment of the present invention for simultaneously generating identically curved surfaces on a plurality of lenses.
Figure 4:
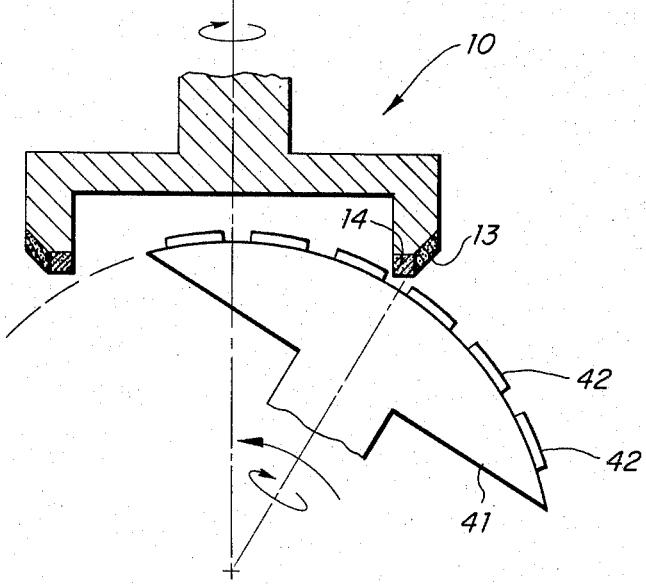

FIGS. 3 and 4 illustrate a second embodiment of the present invention which is designed to enable the rough and fine grinding of a plurality of lenses in a "batch" type process rather than individually. The structure of this embodiment is similar in most respects to the embodiment of FIGS. 1 and 2 and common reference numbers are employed to denote similar elements. The primary distinction between the two embodiments is in the lens blank mounting structure which herein consists of a hemispherically shaped member 41. Mounted around the domed surface of member 41 are a plurality of lens blanks 42 to which are to be given identically curved surfaces. The blanks may be mounted on member 41 with pitch, low melting point alloy or the like and are generally positioned in a generally regular array although this is not essential. The grinding tool 10 may be identical in all respects to that previously described although it will generally be somewhat larger in diameter to enable it to grind the large number of lenses. Hemispherical member 41 is mounted by appropriate structure to be moved along a curved path 43 by means of a suitable drive motor 27, and in the same manner as previously described, as each of the lenses intersects the rough and fine grinding surfaces of the grinding tool they will each be roughly and finely ground to the desired surface configuration in the same manner as described in FIGS. 1 and 2. FIG. 3 illustrates the position of the hemispherical member relative to the grinding tool just prior to the grinding of the lens blanks while FIG. 4 illustrates their relative positions at the completion of the lens grinding operation. In this regard the hemispherical member is preferably rotated slowly as indicated by arrow 46 by means of a suitable drive motor 44 as it moves along path 43. This makes it necessary to move only one-half the circumference of member 41 across the grinding tool to the position shown in FIG. 4 in order to enable all of the lenses to be ground. If member 41 were not rotated, it would be necessary to move its entire circumference across the grinding tool which would necessitate a somewhat more complex mechanical system. It is sufficient to rotate member 41 at a slow rate of approximately 0.5 to about 5 revolutions per minute for good results.

In conclusion, the present invention provides an apparatus that will enable lenses to be both rough and fine ground in a single operation. The apparatus can be adapted to grind one lens at a time or several lenses simultaneously. The aqparatus may be used to grind either glass or plastic lenses and has use in a wide variety of optical fields including ophthalmics and industrial optics. The device is quite simple in design, highly accurate, easy to operate and has a long operating life. Although the illustrated embodiments describe only the generation of convex surfaces, the system could also be utilized to generate concave surfaces with only slight alteration. This and other modifications would readily present themselves to one of ordinary skill in the art. Accordingly, it should be understood that the present invention should be limited only as required by the scope of the following claims.

I claim:
1. Surface generating apparatus comprising:
   a. a grinding tool including:
      1. a first grinding ring for performing a first grinding operation, said first grinding ring having inner and outer peripheral walls and an edge face defining a first grinding surface;
      2. a second grinding ring for performing a second grinding operation, said second grinding ring having inner and outer peripheral walls and an edge face defining a second grinding surface; and
      3. means for supporting said second grinding ring coaxially within said first grinding ring with the inner peripheral wall of said first grinding ring in facing relationship with the outer peripheral wall of said second grinding ring;
   b. means for rotating said first and second grinding rings about their common axis;
   c. means for supporting a work piece upon which a desired surface is to be generated; and
   d. drive means for moving said work piece support means and said grinding tool relative to one another in a curved path about an axis that is substantially perpendicular to the common axis of said first and second grinding rings such that said work piece will sequentially intersect the first and second grinding surfaces of said first and second grinding rings during at least a portion of said path for enabling said first and second grinding rings to perform said first and second grinding operations, respectively, on said work piece, said drive means including means for moving said work piece support means and said grinding tool relative to one another such that said work piece will intersect at least said second grinding surface at an acute angle with respect to the plane of said second grinding surface.

2. Surface generating apparatus as recited in claim 1 wherein said first grinding ring comprises a ring of rough abrasive material and said second grinding ring comprises a ring of fine abrasive material for sequentially performing rough and fine grinding operations on said work piece.

3. Surface generating apparatus as recited in claim 2 wherein said drive means includes means for moving said work piece support means in a curved path toward the common axis of said rings such that said work piece will first intersect said first grinding surface and then intersect said second grinding surface for sequentially performing rough and fine grinding operations on said work piece.

4. Surface generating apparatus as recited in claim 2 wherein said curved path comprises a substantially circular path and wherein the common axis of said first and second grinding rings is aligned to extend through the center of curvature of said circular path for grinding a spherical surface on said work piece.

5. Surface generating apparatus as recited in claim 2 wherein said curved path comprises a substantially circular path and wherein the common axis of said first and second grinding rings is aligned to be spaced from the center of curvature of said circular path for grinding a semi-toroidal surface on said work piece.

6. Surface generating apparatus as recited in claim 2 wherein the thickness of the layer of material removed by said fine grinding operation is a function of the angle of intersection between said work piece and the plane of said fine grinding surface and of the width of said fine grinding surface.

7. Surface generating apparatus as recited in claim 3 wherein said work piece support means comprises a substantially hemispherical shaped support member for supporting a plurality of work pieces around the surface thereof for performing said first and second grinding operations on said plurality of work pieces simultaneously.

8. Surface generating apparatus as recited in claim 7 and including means for rotating said hemispherical member during its movement along said curved path.

9. Surface generating apparatus as recited in claim 2 wherein said rough and fine abrasive materials comprise bonded diamond particles.

* * * * *